United States Patent
McKenney

(10) Patent No.: US 9,552,236 B2
(45) Date of Patent: Jan. 24, 2017

(54) TASKS_RCU DETECTION OF TICKLESS USER MODE EXECUTION AS A QUIESCENT STATE

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/709,528

(22) Filed: May 12, 2015

(65) Prior Publication Data

US 2016/0335136 A1   Nov. 17, 2016

(51) Int. Cl.
*G06F 9/52*   (2006.01)
*G06F 9/48*   (2006.01)

(52) U.S. Cl.
CPC ............. *G06F 9/526* (2013.01); *G06F 9/4881* (2013.01)

(58) Field of Classification Search
CPC ................................ G06F 9/526; G06F 9/4881
See application file for complete search history.

(56) References Cited

U.S. PATENT DOCUMENTS

| | | |
|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,006,247 A | 12/1999 | Browning et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,349,879 B2 | 3/2008 | Alsberg et al. |
| 7,353,346 B2 | 4/2008 | McKenney et al. |
| 7,395,263 B2 | 7/2008 | McKenney |

(Continued)

OTHER PUBLICATIONS

McKenney, P., "[Patch v5 tip/core/rcu 12/16] rcu: Make TASKS_RCU handle nohz_full= CPUs" (Aug. 11, 2014), pp. 1-2 [retrieved from https://lkml.org/lkml/2014/8/11/601].*

(Continued)

*Primary Examiner* — Brian W Wathen
(74) *Attorney, Agent, or Firm* — Walter W. Duft

(57) ABSTRACT

A TASKS_RCU grace period is detected whose quiescent states comprise a task undergoing a voluntary context switch, a task running in user mode, and a task running in idle-mode. A list of all runnable tasks is built. The runnable task list is scanned in one or more scan passes. Each scan pass through the runnable task list searches to identify tasks that have passed through a quiescent state by either performing a voluntary context switch, running in user mode, or running in idle-mode. If found, such quiescent state tasks are removed from the runnable task list. Searching performed during a scan pass includes identifying quiescent state tickless user mode tasks that have been running continuously in user mode on tickless CPUs that have not received a scheduling clock interrupt since commencement of the TASKS_RCU grace period. If the runnable task list is empty, the TASKS_RCU grace period is ended.

13 Claims, 5 Drawing Sheets

(56) References Cited

U.S. PATENT DOCUMENTS

| | | | |
|---|---|---|---|
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,739,685 | B2 | 6/2010 | Vaddagiri |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 2008/0082532 | A1 | 4/2008 | McKenney |
| 2012/0324170 | A1 | 12/2012 | McKenney |
| 2012/0331237 | A1 | 12/2012 | McKenney |
| 2013/0061071 | A1 | 3/2013 | McKenney |
| 2013/0138896 | A1 | 5/2013 | McKenney |
| 2013/0151798 | A1 | 6/2013 | McKenney |
| 2013/0152095 | A1 | 6/2013 | McKenney |
| 2014/0281295 | A1 | 9/2014 | McKenney |
| 2014/0379676 | A1 | 12/2014 | McKenney |
| 2014/0380084 | A1 | 12/2014 | McKenney |

OTHER PUBLICATIONS

Podzimek, A., "Read-Copy-Update for OpenSolaris" (2010), Thesis Paper, Charles University, Prague, pp. 1-90 [retrieved from http://citeseerx.ist.psu.edu/viewdoc/download?doi=10.1.1.185.1547&rep=rep1&type=pdf].*
International Business Machines Corporation, "List of IBM Patents or Patent Applications Treated as Related", Oct. 15, 2015, 2 pages.
P. McKenney et al., "Read-Copy Update: Using Execution History to Solve Concurrency Problems," PDCS, Oct. 1998, 11 pages.
P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al., "Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 Freenix, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document SLAB_Destroy_by_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.

P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.

* cited by examiner

TASKS_RCU DETECTION OF TICKLESS USER MODE EXECUTION AS A QUIESCENT STATE

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer ( ) primitive.

As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference ( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may synchronous or asynchronous. According to the synchronous technique, an updater performs the first phase update operation, invokes a function such as synchronize_rcu ( ) to await a grace period, then blocks (waits) until a grace period has completed, and then implements the second phase update operation, such as by removing stale data. According to the asynchronous technique, an updater performs the first phase update operation, specifies the second phase update operation as a callback, invokes a function such as call_rcu ( ) to await a grace period and invoke callback processing, then resumes with the knowledge that the callback will eventually be processed at the end of the grace period. Advantageously, callbacks requested by one or more updaters can be batched (e.g., on callback lists) and processed as a group at the end of an asynchronous grace period. This allows asynchronous grace period overhead to be amortized over plural deferred update operations.

Modern operating system kernels have been adapted to account for CPU low power states (such as, on Intel® processors, the C1E halt state, or the C2 or deeper halt states). Such operating system kernels can take advantage of low power state capabilities by using mechanisms that withhold regular timer interrupts from CPUs unless the CPUs need such interrupts to perform work. The dynamic tick framework (also called "dyntick" or "nohz") available in current versions of the Linux® kernel is one such mechanism. Selecting the CONFIG_NO_HZ_FULL_IDLE compiler option provides nohz functionality for idle CPUs. In such Linux® kernel builds, the kernel's RCU grace period detection mechanism does not interfere with a CPU entering or remaining in a low power state, provided RCU does not require the CPU to acknowledge a quiescent state in order to end a grace period. The reason for this is because grace period detection processing is normally driven by the scheduling clock interrupt, and such processing cannot be performed on a CPU whose scheduling clock tick is suppressed.

Another Linux® kernel compiler option known as CONFIG_NO_HZ_FULL is used to withhold timer ticks from certain CPUs during times when they have only one runnable task. Such CPUs may be referred to as "adaptive-tick" or "tickless" CPUs. They may be designated at system boot time with the "nohz_full=" boot parameter. When one or more CPUs in a computer system are designated as a tickless CPU, the operating system kernel will avoid disturbing those CPUs whenever they have only a single runnable task. This option may be used to minimize OS jitter for HPC workloads or to improve latencies for real-time workloads. It is desirable that tickless CPUs executing a single runnable task in user mode should not be disturbed, either by scheduling-clock interrupts, IPIs, device interrupts, or kernel threads. All such potential sources of latency and jitter may be kept on some other CPU that has been designated for that purpose. For example, it is customary to exclude the boot CPU (CPU 0) from the nohz_full=set, so that this CPU always receives regular timer ticks and can be used to handle various timer-driven events.

More recently, a flavor of RCU named TASKS_RCU has been developed to allow freeing of "trampolines" (indirect jump vectors), which are used by some forms of tracing and also by some types of no-downtime live-kernel-patching mechanisms. TASKS_RCU is analogous to other flavors of RCU, but with a key difference being that grace period detection is handled by tracking when tasks (rather than CPUs) can no longer hold references to shared data. Other differences include the fact that readers do not invoke any RCU read-side primitives, such as the rcu_read_lock ( ) or rcu_read_unlock ( ) functions used in other flavors of RCU. For updaters, a call_rcu ( ) variant named call_tasks_rcu ( ) is provided for posting callbacks to be processed at the end of a TASKS_RCU grace period.

TASKS_RCU uses voluntary context switch (not preemption) and user mode execution as its sole quiescent states (possibly with addition of the idle loop). At the beginning of a TASKS_RCU grace period, the TASKS_RCU grace period detection mechanism creates a separate list of task structures corresponding to every runnable process in the system. Tasks that are not runnable are deemed unable to hold a reference to data structures protected by TASKS_RCU, and are not therefore included. Each task on the runnable holdout list is deemed a "holdout task," and a special "rcu_tasks_holdout" flag is set in its task structure at the beginning of the TASKS_RCU grace period. This flag is cleared by the operating system scheduler whenever the task voluntarily relinquishes the CPU or returns to user mode. A TASKS_RCU kernel thread loops through the list of holdout tasks on the runnable task list, and removes any that have had their rcu_tasks_holdout flag reset. Once the runnable list is empty, callbacks posted prior to the start of the current grace period, e.g., using the call_rcu_tasks ( ) function, may be invoked.

Unfortunately, the above-described TASKS_RCU grace period detection mechanism will ignore a tickless CPU running a single task in tickless user mode at the time the task is added to the runnable task list. While the task is running, there would be neither a context switch nor a scheduling-clock interrupt to tell TASKS_RCU that the task in question has passed through a quiescent state. Instead, TASKS_RCU would have to wait for the next voluntary context switch, which could extend the grace period indefinitely.

It would therefore be desirable for TASKS_RCU to be able to detect which tasks are running in tickless user mode on tickless CPUs, without disturbing these CPUs.

SUMMARY

A method, system and computer program product are provided for detecting a TASKS_RCU grace period whose quiescent states comprise a task undergoing a voluntary context switch, a task running in user mode (including a tickless user mode task), and a task running in idle-mode. A runnable task list of all runnable tasks is built. The runnable task list is scanned in one or more scan passes. Each scan pass through the runnable task list searches to identify quiescent state tasks that have passed through a quiescent state by either performing a voluntary context switch, running in user mode, or running in idle-mode. If found, such quiescent state tasks are removed from the runnable task list. The searching performed during a scan pass includes identifying quiescent state tickless user mode tasks that have been running continuously in user mode on tickless CPUs that have not received a scheduling clock interrupt since commencement of the TASKS_RCU grace period. If the runnable task list is empty, the TASKS_RCU grace period is ended.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
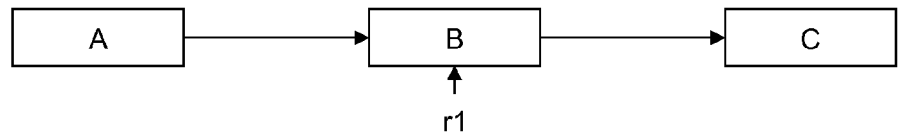
FIGS. 1A-1D are diagrammatic representations of a linked list of data elements undergoing a data element replacement according to a conventional read-copy update mechanism.
Figure 1B:
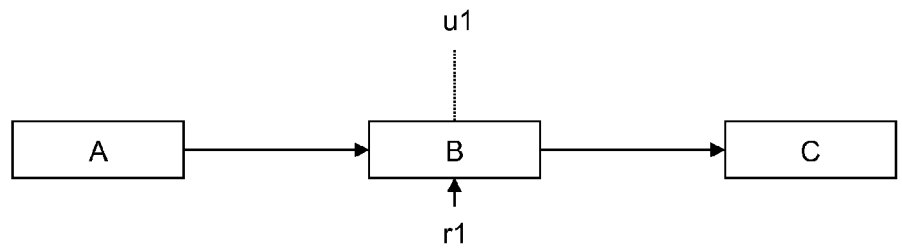
Figure 1C:
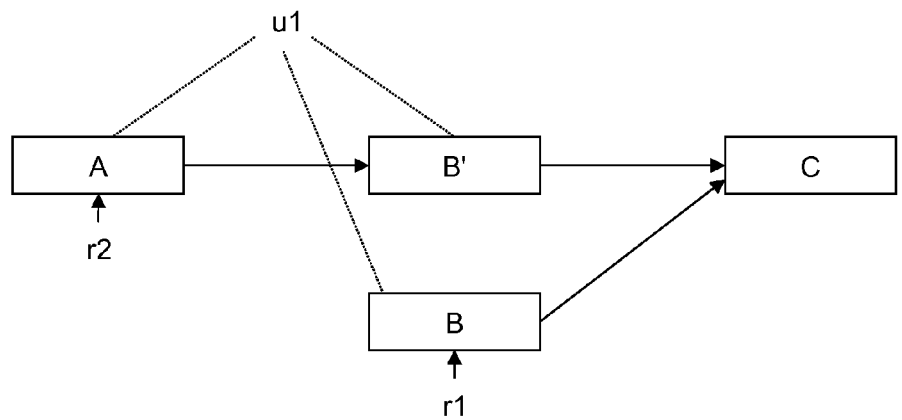
Figure 1D:
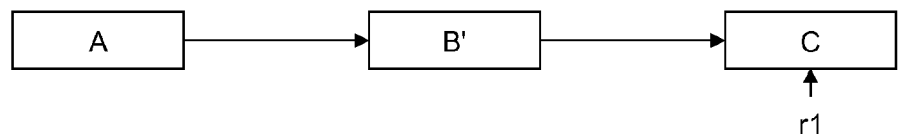
Figure 2A:
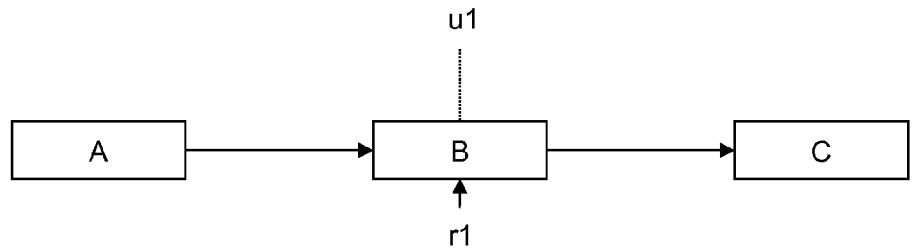
FIGS. 2A-2C are diagrammatic representations of a linked list of data elements undergoing a data element deletion according to a conventional read-copy update mechanism.
Figure 2B:
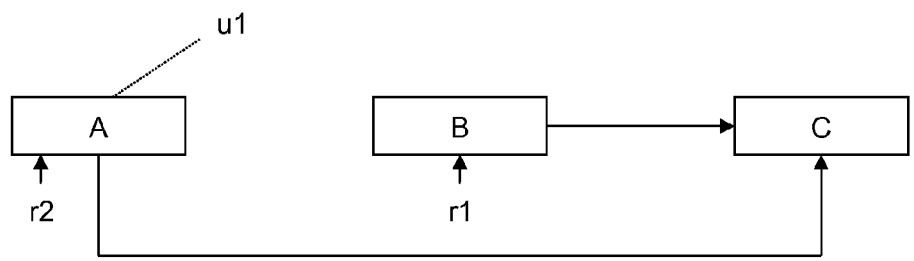
Figure 2C:
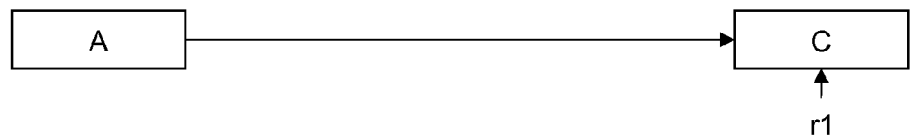
Figure 3:
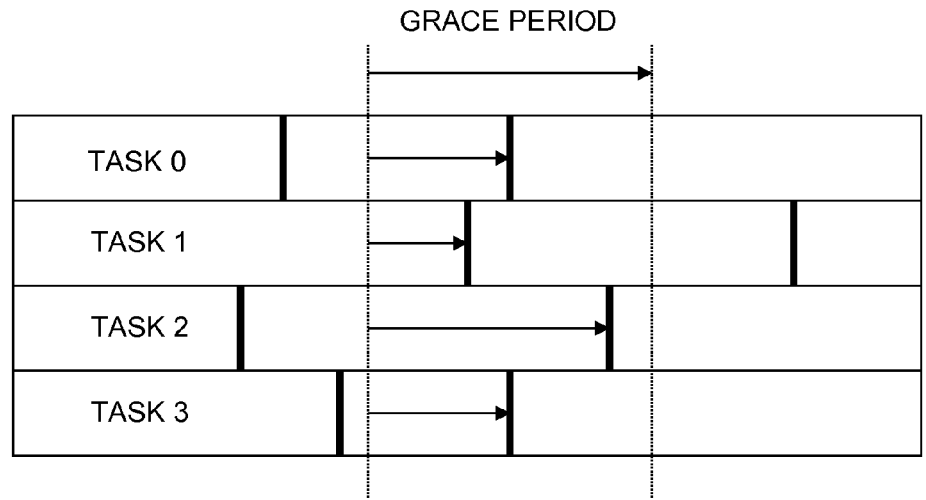
FIG. 3 is a flow diagram illustrating a prior art representation of a grace period in which four processes pass through a quiescent state.
Figure 4:
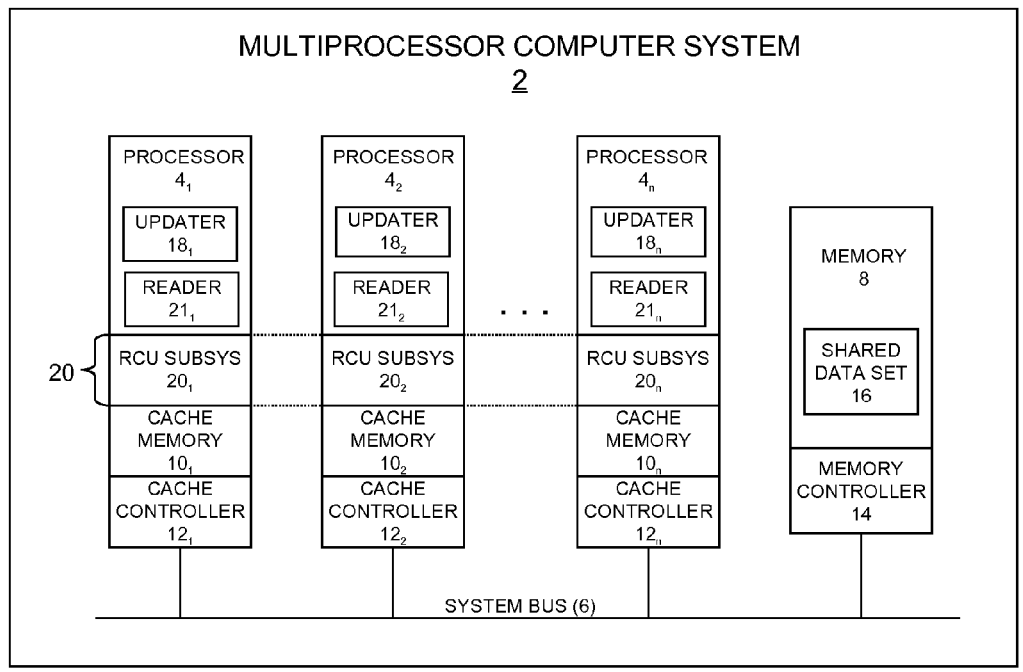
FIG. 4 is a functional block diagram showing a multiprocessor computing system.

Turning now to the figures, wherein like reference numerals represent like elements in all of the several views, FIG. 4 illustrates an example multiprocessor computer system in which the hierarchical RCU grace period detection technique described herein may be implemented. In FIG. 4, a computer system 2 includes a plurality of processors $4_1$, $4_2$ ... $4_n$, a system bus 6, and a program memory 8. There are also cache memories $10_1$, $10_2$ ... $10_n$ and cache controllers $12_1$, $12_2$ ... $12_n$ respectively associated with the processors $4_1$, $4_2$ ... $4_n$. A memory controller 14 is associated with the memory 8. As shown, the memory controller 14 may reside separately from processors $4_2$ ... $4_n$ (e.g., as part of a chipset). As discussed below, it could also comprise plural memory controller instances residing on the processors $4_1$, $4_2$ ... $4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1$, $4_2$ ... $4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1$, $4_2$ ... $4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1$, $10_2$ ... $10_n$ may be implemented in several levels (e.g., as level 1, level 2 and level 3 caches) and the cache controllers $12_1$, $12_2$ ... $12_n$ may collectively represent the cache controller logic that supports each cache level. As illustrated, the memory controller 14 may reside separately from processors $4_1$, $4_2$ ... $4_n$, for example, as part of a discrete chipset. Alternatively, as previously mentioned, the memory controller 14 could be provided by plural memory controller instances that are respectively integrated with the processors $4_1$, $4_2$ ... $4_n$.

Figure 5:
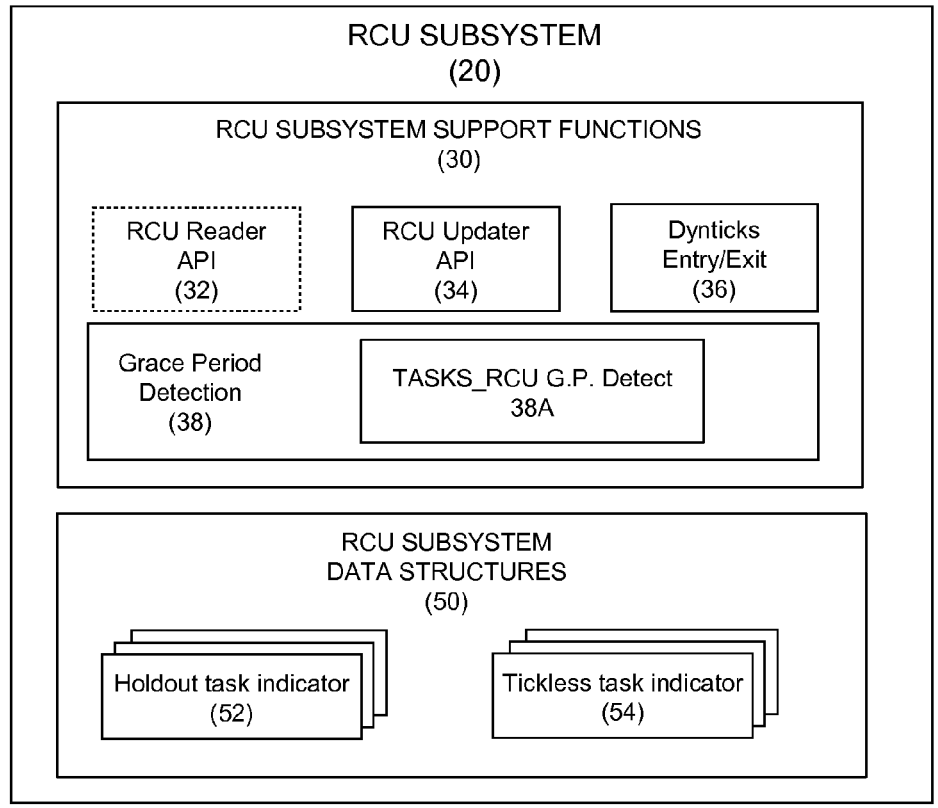
FIG. 5 is a functional block diagram showing an example RCU subsystem that may be provided in the computer system of FIG. 4.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1$, $18_2$ ... $18_n$ illustrate individual data updaters that respectively execute on the several processors $4_1$, $4_2$ ... $4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 5, reference numbers $20_1$, $20_2$ ... $20_n$ represent individual RCU instances that may respectively periodically execute on the several processors $4_1$, $4_2$ ... $4_n$. As described in more detail below, RCU subsystem 20 includes support for TASKS_RCU operation.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 5, reference numerals $21_1$, $21_2$ ... $21_n$ illustrate individual reader instances that may respectively execute on the several processors $4_1$, $4_2$ ... $4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may post a callback to invoke the RCU subsystem 20 that results in the deferred destruction of the pre-update view of the data (second-phase update) following a grace period. The grace period processing performed by the RCU subsystem 20 entails starting new grace periods and detecting the end of old grace periods so that the RCU subsystem 20 knows when it is safe to free stale data (or take other actions).

Turning now to FIG. 5, example support function components 30 of the RCU subsystem 20 are shown. Although the RCU subsystem 20 may support various flavors of RCU, the present disclosure focuses on the RCU flavor known as TASKS_RCU. As discussed in the "Background" section above, whereas other flavors of RCU would normally feature an RCU Reader API that provides read-side primitives such as rcu_read_lock ( ) and rcu_read_unlock ( ), TASKS_RCU does not use such functions. For that reason, FIG. 5 shows the RCU subsystem support functions 30 as only optionally including an RCU Reader API 32 (indicated by the use of dashed lines). The RCU reader API 32 may be provided if the RCU subsystem 20 supports other flavors of RCU, but is not needed for TASKS_RCU. Additional RCU subsystem support functions 30 include an RCU updater API 34, a dynticks entry/exit component 36, and a grace period detection component 38.

The RCU updater API 34 may comprise a TASKS_RCU synchronization primitive, such as call_tasks_rcu ( ), for use by updaters 18 to defer the removal of shared data 16 that may be referenced by the readers 21 until the TASKS_RCU grace period detection component 36A determines that a TASKS_RCU grace period has elapsed.

The dynticks entry/exit component 36 is invoked whenever a CPU enters and exits dynticks mode. Dynticks refers to the Linux® kernel's dynamic tick timer, and dynticks mode refers to the dynamic suppression of timer ticks to a CPU. Dynticks mode is a form of tickless mode operation, and will be referred to as such hereinafter. Among other things, the dynticks entry/exit component 26 is responsible for advising the grace period detection component 38 whenever a CPU enters or exits tickless mode, so that grace period detection may be adjusted in situations where it is appropriate to leave that CPU alone and not require it to participate in RCU grace period advancement.

The grace period detection component 38 tracks RCU grace periods. Among other things, it includes a TASKS_RCU grace period detection component 38A. The TASKS_RCU grace period detection component 38A provides support for starting new TASKS_RCU grace periods and detecting the end of old TASKS_RCU grace periods. Moreover, the TASKS_RCU grace period detection component 36A includes an improved mechanism that facilitates TASKS_RCU quiescent state detection of tasks running in tickless user mode on tickless CPUs, but without disturbing these CPUs.

With continuing reference now to FIG. 5, the RCU subsystem 20 further includes a set of RCU subsystem data structures 50, including two data entities used by the TASKS_RCU grace period detection component 38A to determine when a TASKS_RCU grace periods has ended. The first data entity is referred to as a "holdout task indicator" 52. Multiple instances of the holdout indicator 52 are shown because this indicator can be maintained on a per-task basis. The second data entity is referred to as a "tickless task indicator" 54. There are also multiple instances of this indicator, with per-task and per-CPU embodiments being described in more detail below.

The holdout task indicator 52 is found in previous implementations of TASKS_RCU. As discussed in the "Background" section above, when a new TASKS_RCU grace period is started, a runnable task list of all runnable tasks is created. As used herein, a "runnable" task is a task that has been designated by an operating system scheduler to be in a runnable state, and is either currently running or ready be run on a CPU. In the Linux® operating system kernel, the runnable state is referred to as the TASK RUNNING state.

Each entry in the runnable task list is the task structure that stores relevant information about a particular task. The holdout indicator 52 may be implemented as a task structure flag that is set when the runnable task list is created at the beginning of a TASKS_RCU grace period. In previous implementations of TASKS_RCU, this flag is named "rcu_tasks_holdout," and tasks having this flag set are deemed to be "holdout tasks." The holdout indicator 52 of a holdout task on the runnable tasks list is cleared by the operating scheduler whenever the task voluntarily relinquishes a CPU (e.g., blocks), enters user mode, or runs in idle mode. As the runnable task list is periodically scanned, any tasks with their holdout task indicator 52 cleared are removed.

A TASKS_RCU grace period ends when the runnable task list becomes empty. However, as discussed in the "Background" section above, a TASKS_RCU grace period in a previous TASKS_RCU implementation could stall in the face a tickless user mode task running on a tickless CPU. If the tickless user mode task happened to be running when the TASKS_RCU grace period started and the runnable task list was created, there would be neither a context switch nor a scheduling-clock interrupt to indicate that the task in question had passed through a quiescent state. The TASKS_RCU grace period detection machinery would have to wait for the next voluntary context switch, which could extend the grace period indefinitely.

Figure 6:
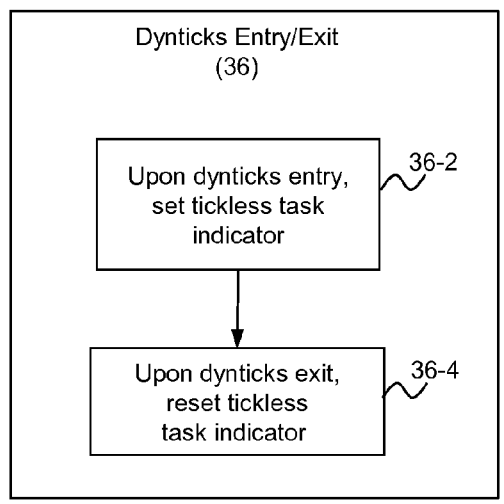
FIG. 6 is a flow diagram showing example operations that may be performed by dynticks entry/exit components of the RCU subsystem of FIG. 5.

The TASKS_RCU grace period detection component 38A uses the tickless task indicator 54 of FIG. 5 to address this issue. As shown in FIG. 6. the tickless task indicator 54 may be managed by the dynticks entry/exit component 36. In particular, as shown by block 36-2, when a CPU enters tickless mode with a task running thereon, the dynticks entry/exit component 36 can set the tickless task indicator 54 on behalf of that task. Conversely, as shown in block 36-4, when a CPU exits dynticks mode with a task running thereon, the dynticks entry/exit component 36 can reset the tickless task indicator on behalf of the task.

The tickless task indicator 54 may be implemented in various ways. In one embodiment, it could be provided as a new task structure field. For example, the new task structure field could be an integer variable having a name such as rcu_tasks_idle_cpu. The tickless task indicator 54 could be set by assigning a value to the rcu_tasks_idle_cpu variable, such as the CPU number of the CPU entering tickless mode. The tickless task indicator 54 could be reset when the CPU leaves tickless mode by assigning a different value to the rcu_tasks_idle_cpu variable, such as special default value (e.g., −1). A description of how the TASKS_RCU grace period detection component 38A might use the tickless task indicator 54 according to this embodiment is described below in connection with FIG. 7.

In another embodiment of the tickless task indicator 54, a per-CPU variable could be used. For example, the dynticks entry/exit component 36 uses a per-CPU tickless mode data structure named rcu_dynticks to indicate whether a CPU is in tickless mode, and to store related information. The tickless task indicator 54 could be implemented as a new field of the rcu_dynticks tickless mode data structure. For example, the new tickless mode data structure field could be a task structure pointer variable having a name such as *dynticks_tsk. To set the tickless task indicator 54, the *dynticks_tsk variable could be assigned to point to the task structure of the task currently running on the tickless mode CPU. To reset the tickless task indicator 54, the *dynticks_tsk variable could be assigned the NULL pointer. A description of how the TASKS_RCU grace period detection component 38A might use the tickless task indicator 54 according to this embodiment is described below in connection with FIG. 7.

Figure 7:
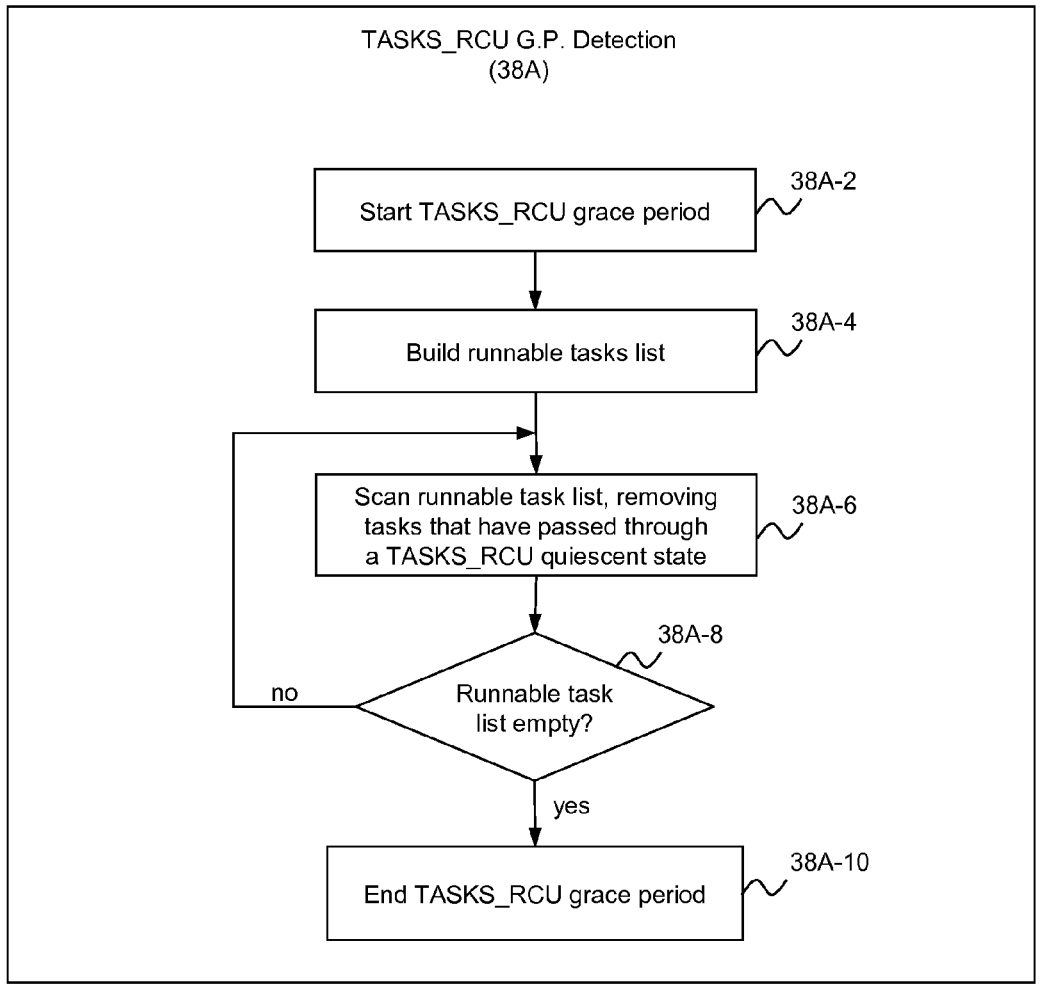
FIG. 7 is a flow diagram showing example operations that may be performed by a TASKS_RCU grace period detection component of the RCU subsystem of FIG. 5.

Turning now to FIG. 7, a framework may now be described for detecting a TASKS_RCU grace period whose quiescent states comprise a task undergoing a voluntary context switch, a task running in user mode (including a tickless user mode task on a tickless CPU), and a task running in idle-mode. The illustrated operations are performed by the TASKS_RCU grace period detection component 38A shown in FIG. 5.

Block 38A-2 of FIG. 7 starts a new TASKS_RCU grace period. This operation may include waiting for an RCU-sched grace period that ensures every CPU will have executed a memory barrier since the last time it executed in kernel mode outside of the idle loop. These memory barriers substitute for the heavyweight operations that would otherwise be needed on the more frequent transitions to and from tickless mode.

In block 38A-4, the TASKS_RCU grace period detection component 38A builds a runnable task list of all runnable tasks being managed by the operating system scheduler. Block 38A-4 also includes the TASKS_RCU grace period detection component 38A setting the holdout task indicator 52 in the task structure of each task on the list.

Blocks 38A-6 and 38A-8 represent a loop in which the runnable task list is scanned in one or more scan passes. Each scan pass through the runnable task list searches to identify quiescent state tasks that have passed through a quiescent state by either performing a voluntary context switch, running in user mode, or running in idle-mode. If found, such quiescent state tasks are removed from the runnable task list. The searching performed during a scan pass includes identifying quiescent state tickless user mode tasks that have been running continuously in user mode on tickless CPUs that have not received a scheduling clock interrupt since commencement of the TASKS_RCU grace period.

If the runnable task list is determined to be empty in block 38A-8, the TASKS_RCU grace period is ended in block 38A-10. The latter operation may include waiting for another RCU-sched grace period that ensures every CPU will have executed a memory barrier before taking any action that is ordered after the end of the TASKS_RCU grace period. These memory barriers substitute for the heavyweight operations that would otherwise be needed on the more frequent transitions to and from tickless mode.

The task removal operation of block 38A-6 attempts to identify quiescent state tasks by inspecting the task structure of each task on the runnable task list to identify tasks whose holdout task indicator 52 has been cleared by the operating system scheduler. In addition, block 38A-6 attempts to identify quiescent state tickless user mode tasks by checking for tasks having an associated tickless task indicator 54 set. As disclosed above, the tickless task indicator 54 is set during a CPU's entry into tickless mode to indicate that a current task running on the CPU is a tickless user mode task. The tickless task indicator 54 is reset during a CPU's exit from tickless mode to indicate that a current task running on the CPU is not a tickless user mode task. As previously explained in connection with FIG. 6, the setting and resetting of the tickless task indicator 54 may be handled by the dynticks entry/exit component 36 of FIG. 5. This in contrast to the holdout indicator 52, which is set by the TASKS_RCU grace period detection component 38A in block 38A-4 of FIG. 7, and thereafter cleared by the operating system scheduler when the task state changes at some point during the runnable task list scan processing of blocks 38A-6 and 38A-8.

As previously noted, if the tickless task indicator 54 is embodied as a task structure variable stored in a task structure for the current task, this task structure variable may be set by assigning it the CPU number of a CPU on which the current task is running. The task structure variable may be reset by assigning it a special default value. In this embodiment, the TASKS_RCU grace period detection component 38A may readily identify a quiescent state tickless user mode task as any task whose task structure variable does not equal the special default value.

As also noted above, if the tickless task indicator 54 is embodied as a per-CPU variable stored in a tickless mode data structure that tracks whether a CPU is in tickless mode, the per-CPU variable may be set by assigning it a pointer to the task structure of the task currently running on the CPU, and may be reset by assigning it the NULL pointer. In this embodiment, the TASKS_RCU grace period detection component 38A may readily identify a quiescent state tickless user mode task by checking each of the tickless mode data structures, and checking the per-CPU variable to see if it points to a task structure on the runnable task list.

Accordingly, a technique has been disclosed for accounting for tasks running on tickless CPUs during detection of a TASKS_RCU grace period. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-7.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 8:
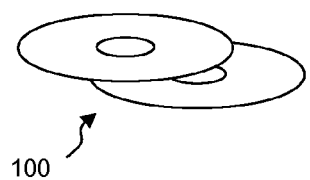
FIG. 8 is a diagrammatic illustration showing example computer readable data storage media that may be used to provide a computer program product.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 100 in FIG. 8.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A system, comprising:
a plurality of CPUs;
a memory coupled to said CPUs, said memory including a computer readable storage medium tangibly embodying at least one program of instructions executable by said CPUs to perform operations for detecting a TASKS_RCU grace period whose quiescent states comprise a task undergoing a voluntary context switch, a task running in user mode, and a task running in idle-mode, said operations comprising:
building a runnable task list of all runnable tasks in said system,
scanning said runnable task list in one or more scan passes;
on each scan pass through said runnable task list, searching to identify quiescent state tasks that have passed through a quiescent state by either performing a voluntary context switch, running in user mode, or running in idle-mode, and if found, removing said quiescent state tasks from said runnable task list;
said searching including identifying quiescent state tickless user mode tasks that have been running continuously in user mode on tickless CPUs that have not received a scheduling clock interrupt since commencement of said TASKS_RCU grace period; and
if said runnable task list is empty, ending said TASKS_RCU grace period.

2. The system of claim 1, wherein said identifying quiescent state tickless user mode tasks includes checking for a tickless task indicator associated with each said quiescent state tickless user mode task.

3. The system of claim 2, wherein said tickless task indicator is set during a CPU's entry into tickless mode to indicate that a current task running on said CPU is a tickless user mode task, and reset during a CPU's exit from tickless mode to indicate that a current task running on said CPU is not a tickless user mode task.

4. The system of claim 3, wherein said tickless task indicator comprises a task structure variable stored in a task structure for said current task.

5. The system of claim 4, wherein said task structure variable is set by assigning it a CPU number of said CPU on which said current task is running, and wherein said task structure variable is reset by assigning it a predetermined special value.

6. The system of claim 3, wherein said tickless task indicator comprises a per-CPU variable stored in a tickless mode data structure that tracks whether a CPU is in tickless mode.

7. The system of claim 6, wherein said per-CPU variable is set by assigning it a pointer to a task structure of said current task, and wherein said per-CPU variable is reset by assigning it a NULL pointer.

8. A computer program product, comprising:
one or more computer readable data storage media;
program instructions stored on said one or more computer readable data storage media for programming a data processing platform having a plurality of CPUs to perform operations for detecting a TASKS_RCU grace period whose quiescent states comprise a task undergoing a voluntary context switch, a task running in user mode, and a task running in idle-mode, said operations comprising:
building a runnable task list of all runnable tasks on said data processing platform,
scanning said runnable task list in one or more scan passes;
on each scan pass through said runnable task list, searching to identify quiescent state tasks that have passed through a quiescent state by either performing a voluntary context switch, running in user mode, or running in idle-mode, and if found, removing said quiescent state tasks from said runnable task list;
said searching including identifying quiescent state tickless user mode tasks that have been running continuously in user mode on tickless CPUs that have not received a scheduling clock interrupt since commencement of said TASKS_RCU grace period; and
if said runnable task list is empty, ending said TASKS_RCU grace period.

9. The computer program product of claim 8, wherein said identifying quiescent state tickless user mode tasks includes checking for a tickless task indicator associated with each said quiescent state tickless user mode task.

10. The computer program product of claim 9, wherein said tickless task indicator is set during a CPU's entry into tickless mode to indicate that a current task running on said CPU is a tickless user mode task, and reset during a CPU's exit from tickless mode to indicate that a current task running on said CPU is not a tickless user mode task.

11. The computer program product of claim 10, wherein said tickless task indicator comprises a task structure variable stored in a task structure for said current task.

12. The computer program product of claim 11, wherein said task structure variable is set by assigning it a CPU number of said CPU on which said current task is running, and wherein said task structure variable is reset by assigning it a predetermined special value.

13. The computer program product of claim 10, wherein said tickless task indicator comprises a per-CPU variable stored in a tickless mode data structure that tracks whether a CPU is in tickless mode, and wherein said per-CPU variable is set by assigning it a pointer to a task structure of said current task, and wherein said per-CPU variable is reset by assigning it a NULL pointer.

* * * * *